United States Patent [19]
Schotthoefer

[11] Patent Number: 5,582,048
[45] Date of Patent: Dec. 10, 1996

[54] SPARE TIRE SECURITY DEVICE

[75] Inventor: Gerald R. Schotthoefer, Dallas, Tex.

[73] Assignee: Adell Corporation, Sunnyvale, Tex.

[21] Appl. No.: 190,286

[22] Filed: Feb. 2, 1994

[51] Int. Cl.⁶ .................................................. E05B 65/12
[52] U.S. Cl. ................................................ 70/259; 70/182
[58] Field of Search ............................ 70/259, 260, 416;
224/42.12, 42.13, 42.21, 42.23, 42.25, 42.29,
42.16

[56] References Cited

U.S. PATENT DOCUMENTS

| | | | |
|---|---|---|---|
| 1,464,908 | 6/1921 | Kettering | 70/183 |
| 4,526,021 | 7/1985 | Princell | 70/259 |
| 4,537,555 | 8/1985 | Combs | 224/42.25 |
| 4,732,019 | 3/1988 | Tolar | 70/181 |
| 4,988,023 | 1/1991 | Heathcoat | 224/42.21 |
| 5,077,995 | 1/1992 | Appelbaum | 70/259 |
| 5,199,287 | 4/1993 | McClary | 70/259 |
| 5,330,313 | 7/1994 | Easterwood | 70/259 |
| 5,343,722 | 9/1994 | Richardson | 70/259 |
| 5,426,963 | 6/1995 | Tafoya | 70/259 |

Primary Examiner—Steven N. Meyers
Assistant Examiner—Gary Estremsky
Attorney, Agent, or Firm—W. Thomas Timmons; Timmons & Kelly

[57] ABSTRACT

A cylindrical winch tube cover is placed over the rear end of the hoist shaft for blocking access to the rear end of the hoist shaft. A lock bracket is mounted on the winch tube cover, and a padlock secures the lock bracket to the winch tube cover and prevents removal of the winch tube cover from the hoist shaft. The shackle of the padlock passes through a pair of aligned holes in the lock bracket and a groove in the winch tube cover.

15 Claims, 4 Drawing Sheets

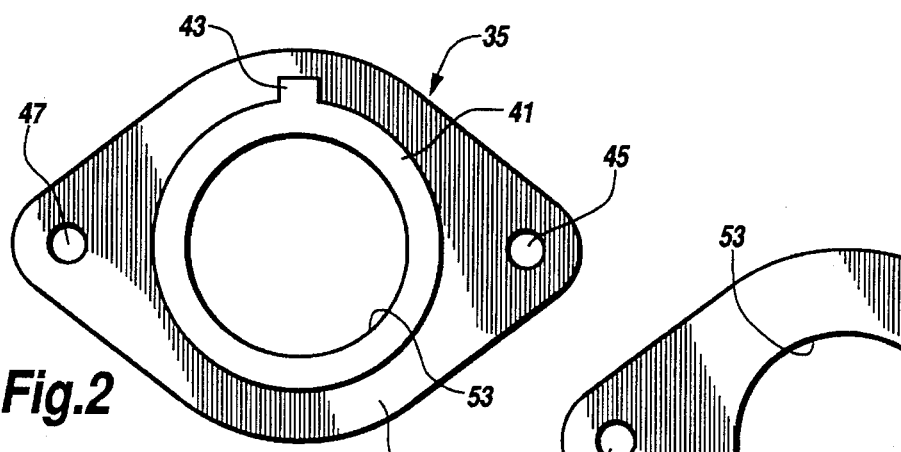
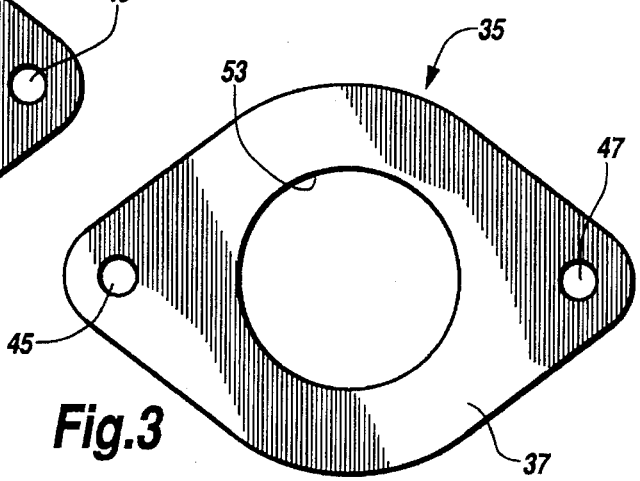
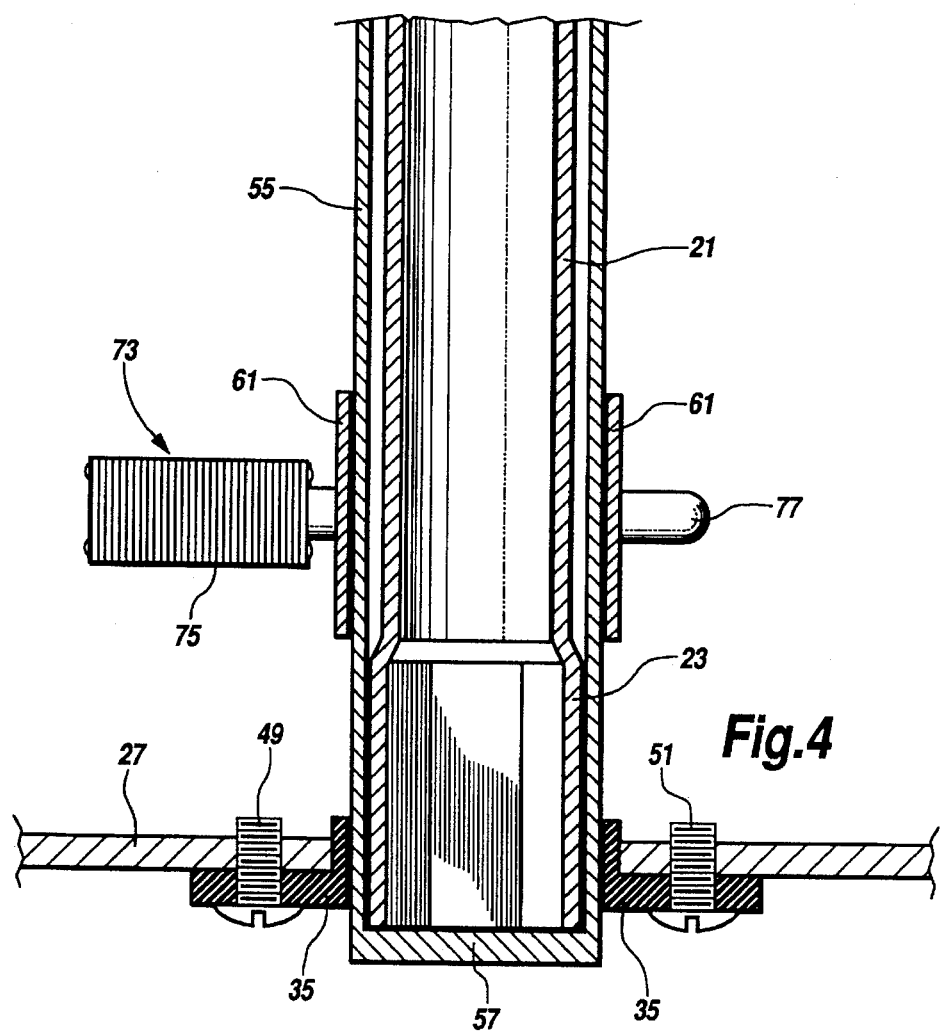

5,582,048

SPARE TIRE SECURITY DEVICE

BACKGROUND OF THE INVENTION

1. Field of the Invention

This invention relates in general to security devices for securing spare tires. In particular, the invention relates to security devices for securing a spare tire mounted on a hoist having a hoist shaft accessible through an opening in the rear channel of the pickup box.

2. Description of Related Art

U.S. Pat. No. 5,199,287, issued Apr. 6, 1993, to McClary, shows a device for securing a spare tire mounted on a hoist having a hoist shaft accessible through an opening in the bumper. The device includes a locking shaft extending from the end of the hoist shaft to the opening in the bumper. The device also has a padlock inserted through a hole in the locking shaft for preventing the removal of the locking shaft from the hoist shaft.

U.S. Pat. No. 5,077,995, issued Jan. 7, 1992, to Appelbaum, discloses another device for securing a spare tire. The device includes a locking shaft extending from the hoist shaft to near an opening in the bumper. A lock attached to the end of the locking shaft extends through the opening in the bumper to prevent removal of the locking shaft. The other end of the locking shaft inserts into the end of the hoist shaft.

Recently designed trucks, such as the Dodge Ram T-300, have hoist shafts that extend into an opening in the rear channel of the pickup box. The security devices known in the prior art will not work with this design, because the end of the hoist shaft is not spaced apart from the rear channel. A new security device was needed for preventing access to the end of this new type of hoist shaft.

SUMMARY OF THE INVENTION

The general object of the security device of the invention is to prevent the unauthorized removal of a spare tire mounted on a hoist shaft under the rear of a truck. In particular, the object of the invention is to prevent unauthorized rotation of the hoist shaft. This object is accomplished by a security device having a winch tube cover placed over the rear end of the hoist shaft, and extending into the opening in the rear channel.

A U-shaped lock bracket is placed over the winch tube cover, and a padlock is placed through a pair of aligned holes in the straight portions of the lock bracket. The link of the padlock also passes through a groove in one side of the winch tube cover. The padlock thus secures the lock bracket to the winch tube cover. The winch tube cover cannot then be removed from the hoist shaft, because the lock bracket is too large to pass through the opening in the rear channel.

The above, as well as additional objects, features, and advantages of the invention will become apparent in the following detailed description.

BRIEF DESCRIPTION OF THE DRAWINGS

FIG. 2 is a front elevation of a flange bushing according to the invention.

FIG. 3 is a rear elevation of the flange bushing according to the invention.

FIG. 4 is a cross sectional view of the locking shaft of the invention, as seen along lines 4—4 in FIG. 8.

DESCRIPTION OF THE PREFERRED EMBODIMENT

Figure 1:
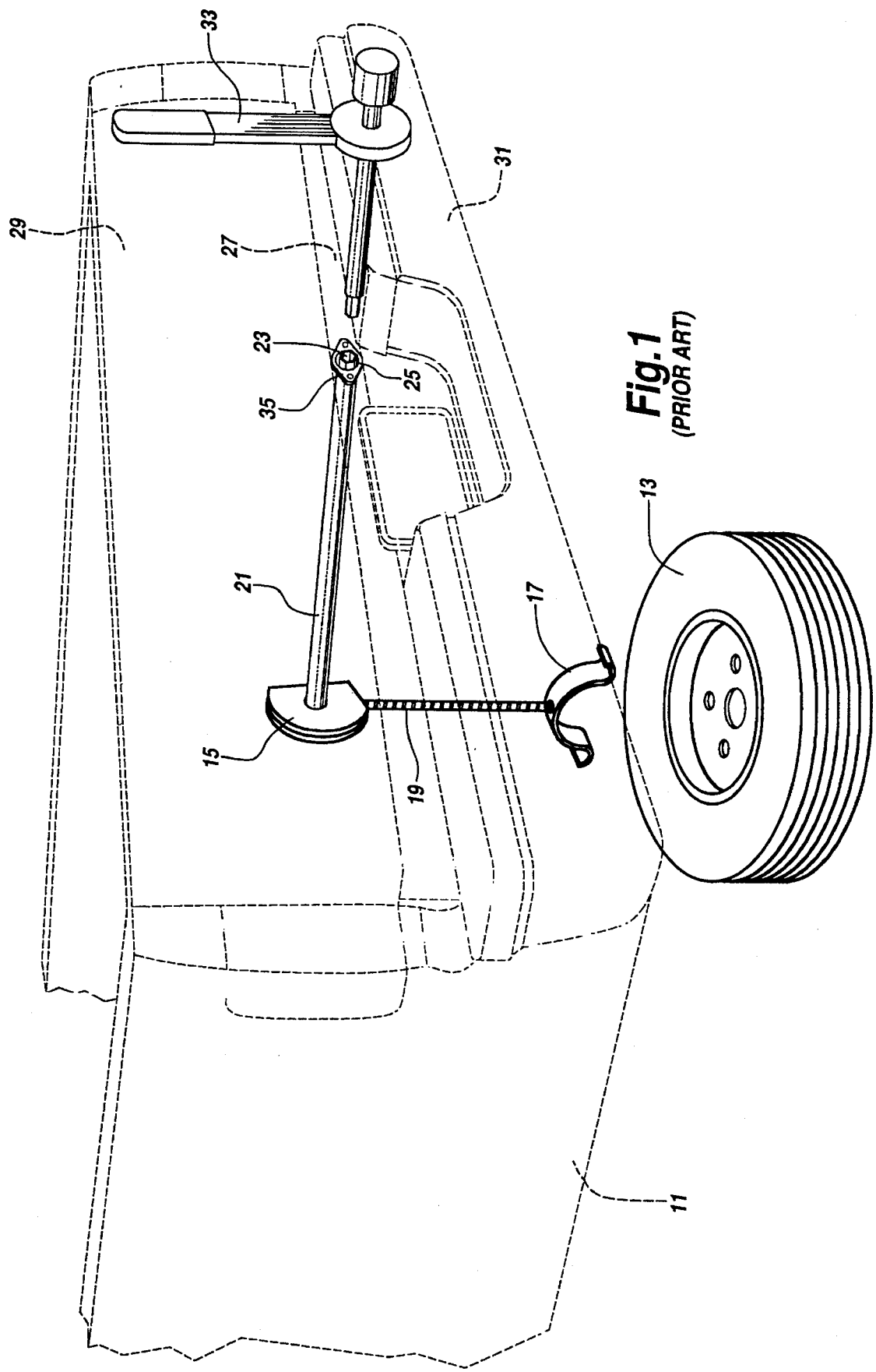
FIG. 1 is a perspective view of the rear end of a truck having a spare tire mounted on a hoist of the type having a hoist shaft accessible through an opening in the rear channel of the pickup box.

FIG. 1 illustrates a portion of a typical pickup truck 11 of a recent design. The truck 11 has a spare tire 13, suspended from a hoist 15 on a retainer 17 on the lower end of a cable 19.

A hoist shaft 21 extends from the hoist 15 toward the rear of the truck 11. The hoist shaft 21 is generally cylindrical, with a female hexagonal socket 23 on the rear end of the shaft 21.

The hexagonal socket 23 is located within an opening 25 in the rear channel 27 of the truck 11, just below the tail gate 29. As an alternative, the opening 25 and the socket 23 could possibly be located in the bumper 31 rather than the rear channel 27.

A ratchet 33 having a male hexagonal end can be used to rotate the hoist shaft 21. As the hoist shaft 21 is rotated, the hoist 15 will raise or lower the spare tire 13.

A rubber flange bushing 35 is mounted on the rear channel 27 around the opening 25. The flange bushing 35 is shown in detail in FIGS. 2 and 3. The flange bushing 35 has a flat rear surface 37 and a flat front surface 39. A circular extension 41 extends from the front surface 39 into the opening 25 in the rear channel 27. A key 43 on the extension 41 insures that the flange bushing 35 is aligned properly.

Figure 5:
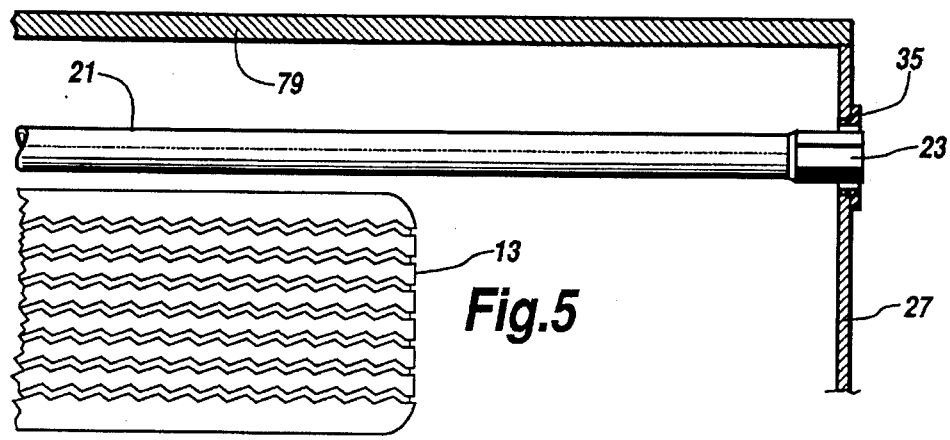
FIG. 5 is a left side elevation of the hoist shaft, without the security device.

The flange bushing 35 has a pair of small holes 45 and 47 so that sheet metal screws 49 and 51 may be used to secure the flange bushing 35 to the rear channel 27, as shown in FIG. 4. The flange bushing 35 also has a large circular hole 53. The large hole 53 does not pass through the flange bushing 35 at a right angle, but is slightly angled, because the opening 25 in the rear channel 27 is not directly behind the hoist 15. As shown in FIGS. 4 and 5, the hexagonal socket 23 of the hoist shaft 21 extends slightly through the opening 25 of the rear channel 27 and the hole 53 in the flange bushing 35.

The pickup truck 11 is originally equipped with a prior art flange bushing. The flange bushing 35 of the invention is similar to the original flange bushing, except that the large hole 53 has a slightly larger diameter.

Figure 6:
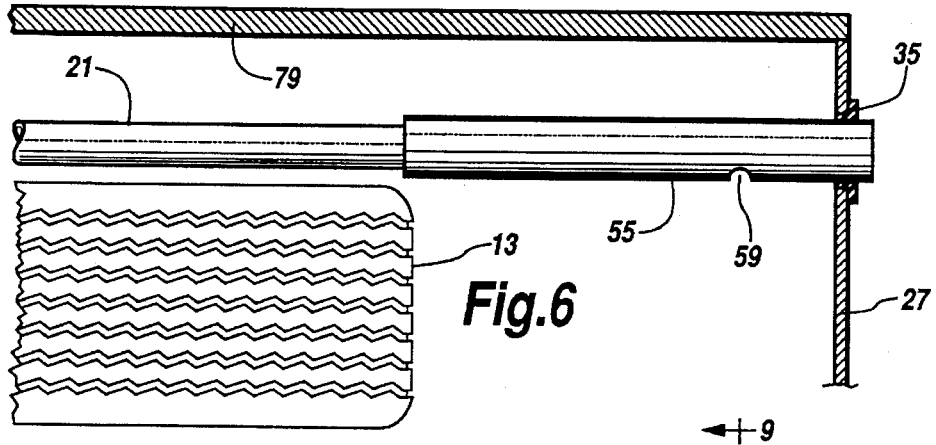
FIG. 6 is a left side elevation of the hoist shaft, with the winch tube cover installed.

As shown in FIGS. 4 and 6, a cylindrical winch tube cover 55 is placed over the rear end of the hoist shaft 21. The tube cover 55 has a cap 57 that engages the end of the hoist shaft 21 to prevent unauthorized access to the socket 23 and to keep the winch tube cover 55 from being moved further forward. The winch tube cover 55 extends slightly through the opening 25 of the rear channel 27 and the hole 53 in the flange bushing 35.

The winch tube cover 55 also has a groove 59 through one side, as shown in FIGS. 5 and 9–11. The groove 59 is semicircular and is located about two inches (five centimeters) from the cap 57.

Figure 7:
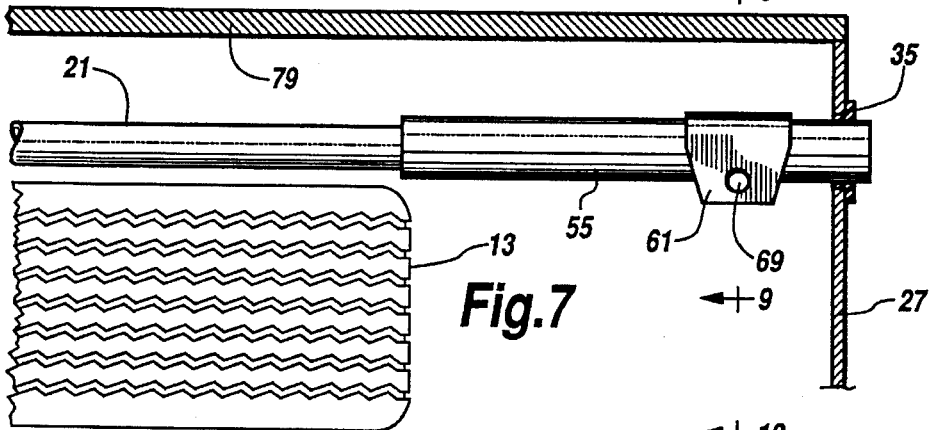
FIG. 7 is a left side elevation of the hoist shaft, with the winch tube cover and the lock bracket installed.
Figure 9:
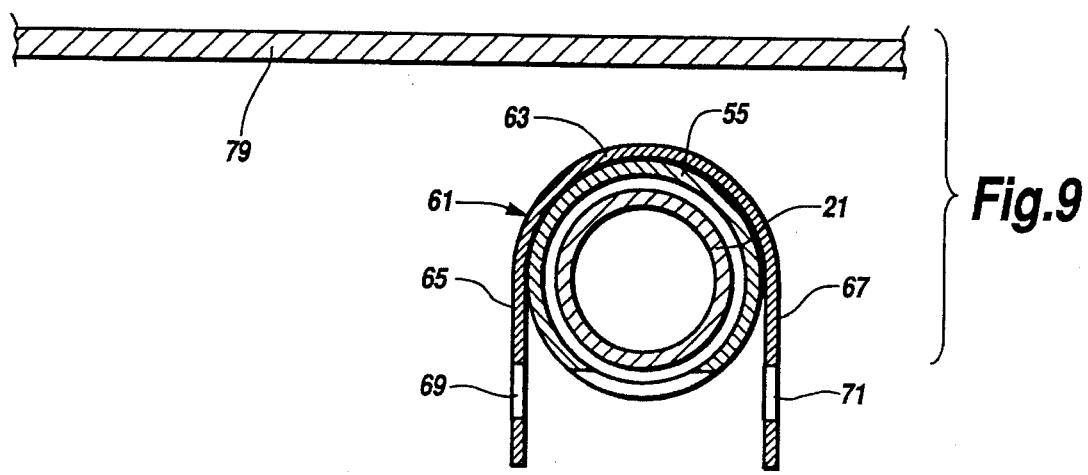
FIG. 9 is a cross sectional view of the hoist shaft, as seen along lines 9—9 in FIG. 7.

As shown in FIGS. 4, 7, and 9, a lock bracket 61 is placed over the winch tube cover 55. The lock bracket 61 is U-shaped, as seen in FIG. 9, and has a circular portion 63, and two straight portions 65 and 67. A pair of aligned holes 69 and 71 pass through the two straight portions 65 and 67 of the lock bracket 61. The holes 69 and 71 align with one another, and with the groove 59 in the winch tube cover 55.

Figure 8:
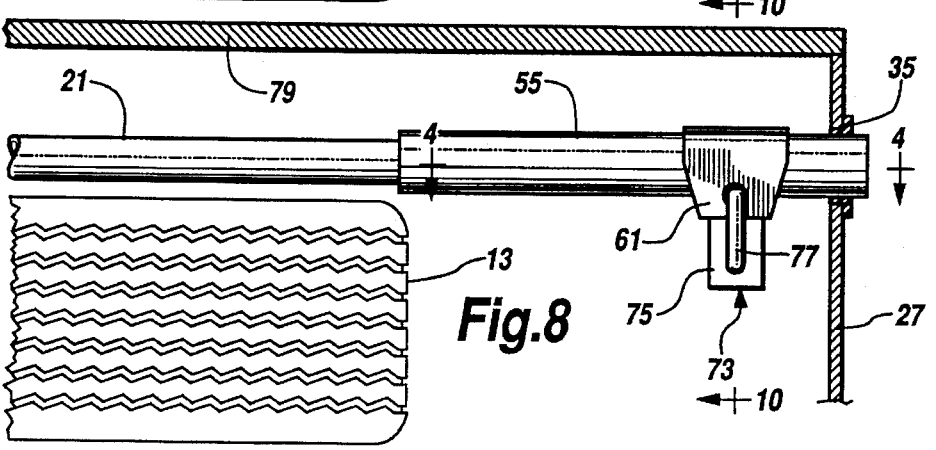
FIG. 8 is a left side elevation of the hoist shaft, with the winch tube cover, the lock bracket, and the padlock installed.
Figure 10:
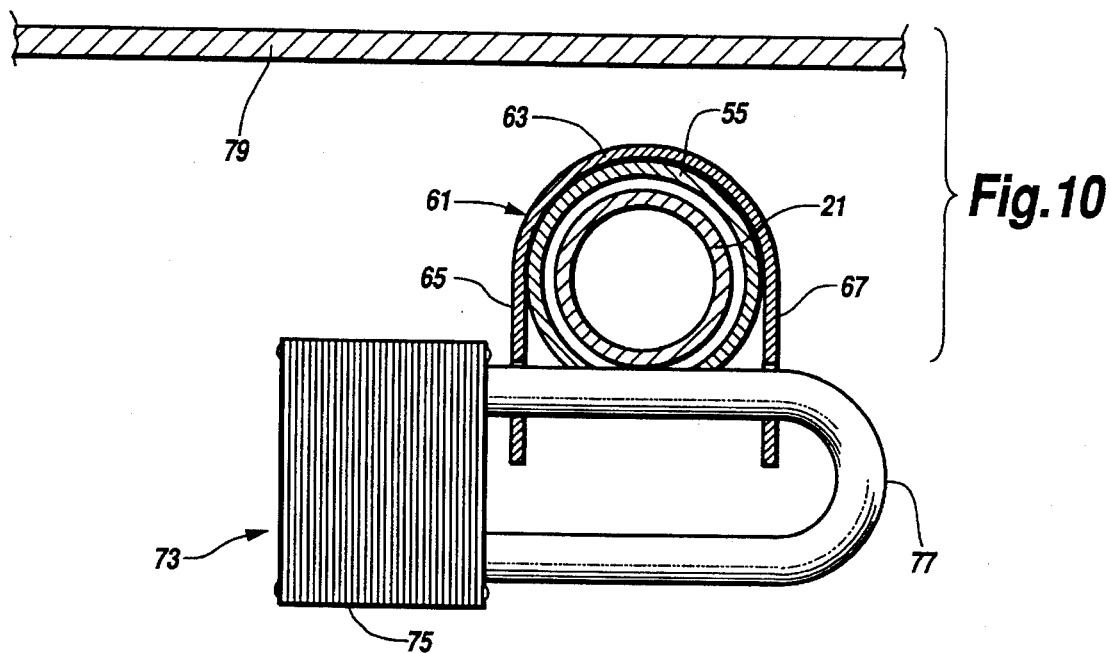
FIG. 10 is a cross sectional view of the hoist shaft, as seen along lines 10—10 in FIG. 8.
Figure 11:
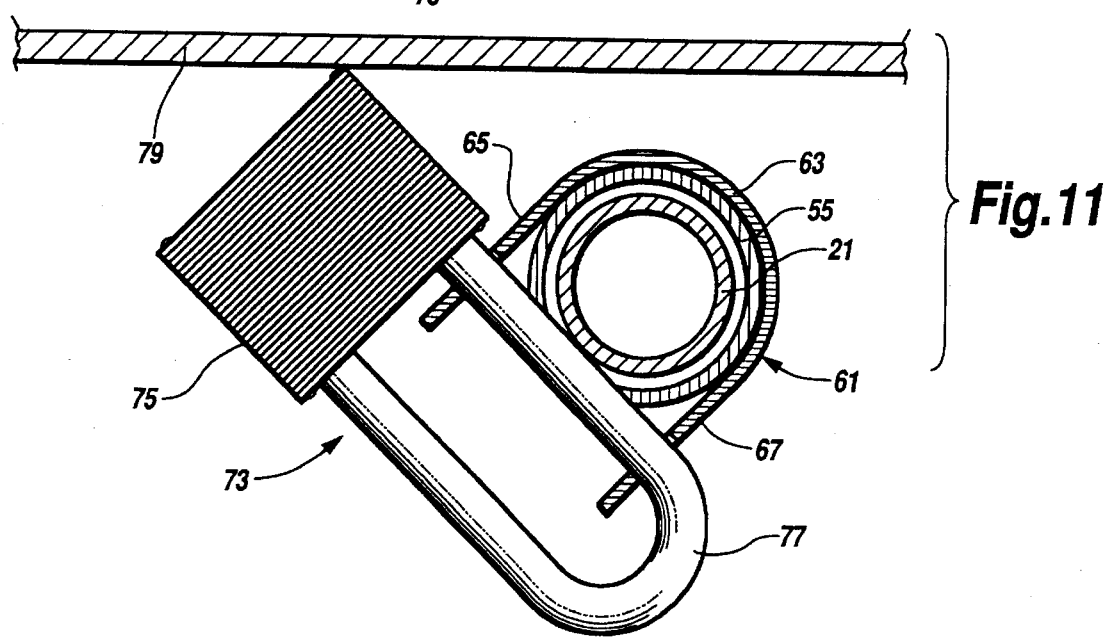
FIG. 11 is a cross sectional view of the hoist shaft, as seen along lines 10—10 in FIG. 8, with the winch tube cover, the lock bracket, and the padlock pivoted to a maximum position.

A padlock 73, having a body 75 and a shackle 77, secures the lock bracket 61 to the winch tube cover 55, as shown in FIGS. 4, 8, and 10. The shackle 77 of the padlock passes through the holes 69 and 71 of the lock bracket 61, and through the groove 59 in the winch tube cover 55. The padlock 73 thus constitutes locking means for securing the lock bracket 61 to the winch tube cover 55 and for preventing removal of the winch tube cover 55 from the hoist shaft. If the winch tube cover 55 is pivoted, the body 75 of the padlock 73 contacts the floor 79 of the pickup bed and prevents further rotation of the winch tube cover 55.

The security device of the invention has several advantages over the prior art. The security device of the invention does not allow the hoist shaft to be rotated, which will lower the spare tire. Also, the security device of the invention is inexpensive and easy to install and to remove.

The invention has been described in only one embodiment. It should be apparent to those skilled in the art that the invention is not so limited, but is susceptible to various changes and modifications without departing from the spirit of the invention.

I claim:

1. A device for securing a spare tire mounted on a hoist having a hoist shaft, the rear end of the hoist shaft being accessible through an opening in a rear channel, comprising:

a cylindrical winch tube cover placed over the rear end of the hoist shaft for blocking access to the rear end of the hoist shaft, wherein the winch tube cover is rotatable independently of the hoist shaft;

a U-shaped bracket, with a curved portion between two straight portions, mounted on the winch tube cover; and locking means for securing the U-shaped bracket to the winch tube cover and for preventing removal of the winch tube cover from the hoist shaft.

2. A device for securing a spare tire, as recited in claim 1, wherein the lock bracket has a pair of aligned holes through the straight portions for receiving the locking means.

3. A device for securing a spare tire, as recited in claim 2, wherein the locking means is a padlock.

4. A device for securing a spare tire, as recited in claim 3, wherein the padlock has a shackle that passes through the aligned holes through the straight portions of the lock bracket.

5. A device for securing a spare tire, as recited in claim 4, wherein the shackle of the padlock also passes through a groove in the winch tube cover.

6. A device for securing a spare tire mounted on a hoist having a hoist shaft, the rear end of the hoist shaft being accessible through an opening in a rear channel, comprising:

a cylindrical winch tube cover placed over the rear end of the hoist shaft for blocking access to the rear end of the hoist shaft, wherein the winch tube cover is rotatable independently of the hoist shaft;

a U-shaped bracket, with a curved portion between two straight portions, mounted on the winch tube cover;

locking means for securing the U-shaped bracket to the winch tube cover and for preventing removal of the winch tube cover from the hoist shaft; and a flange bushing mounted in the opening in the rear channel or preventing the winch tube cover from contacting the rear channel.

7. A device for securing a spare tire, as recited in claim 6, wherein the lock bracket has a pair of aligned holes through the straight portions for receiving the locking means.

8. A device for securing a spare tire, as recited in claim 7, wherein the locking means is a padlock.

9. A device for securing a spare tire, as recited in claim 8, wherein the padlock has a shackle that passes through the aligned holes through the straight portions of the lock bracket.

10. A device for securing a spare tire, as recited in claim 9, wherein the shackle of the padlock also passes through a groove in the winch tube cover.

11. A device for securing a spare tire mounted on a hoist having a hoist shaft, the rear end of the hoist shaft being accessible through an opening in a rear channel, comprising:

a cylindrical winch tube cover placed over the rear end of the hoist shaft for blocking access to the rear end of the hoist shaft, wherein the winch tube cover is rotatable independently of the hoist shaft;

a U-shaped bracket, with a curved portion between two straight portions, mounted on the winch tube cover; and a padlock for securing the U-shaped bracket to the winch tube cover and for preventing removal of the winch tube cover from the hoist shaft.

12. A device for securing a spare tire, as recited in claim 11, wherein the lock bracket has a pair of aligned holes through the straight portions for receiving the locking means.

13. A device for securing a spare tire, as recited in claim 12, wherein the padlock has a shackle that passes through the aligned holes through the straight portions of the lock bracket.

14. A device for securing a spare tire, as recited in claim 13, wherein the shackle of the padlock also passes through a groove in the winch tube cover.

15. A device for securing a spare tire mounted on a hoist having a hoist shaft, the rear end of the hoist shaft being accessible through an opening in a rear channel, comprising:

a cylindrical winch tube cover placed over the rear end of the hoist shaft for blocking access to the rear end of the hoist shaft, wherein the winch tube cover is rotatable independently of the hoist shaft;

a U-shaped lock bracket, mounted on the winch tube cover; and a padlock for securing the lock bracket to the winch tube cover and for preventing removal of the winch tube cover from the hoist shaft, wherein the padlock passes through a hole in the lock bracket and through a groove in the winch tube cover.

* * * * *